(12) United States Patent
Yanagawa

(10) Patent No.: US 6,199,610 B1
(45) Date of Patent: Mar. 13, 2001

(54) ANTI-SKID MEMBER AND TIRE EQUIPPED WITH THE ANTI-SKID MEMBER

(75) Inventor: Koichi Yanagawa, deceased, late of Osaka (JP), by Eikichi Yanagawa, administrator

(73) Assignee: Goichi Rubber Co., Ltd., Osaka (JP)

( * ) Notice: Subject to any disclaimer, the term of this patent is extended or adjusted under 35 U.S.C. 154(b) by 0 days.

(21) Appl. No.: 09/077,568

(22) PCT Filed: Oct. 9, 1996

(86) PCT No.: PCT/JP96/02949

§ 371 Date: Jun. 1, 1998

§ 102(e) Date: Jun. 1, 1998

(87) PCT Pub. No.: WO98/15419

PCT Pub. Date: Apr. 16, 1998

(51) Int. Cl.[7] .............. B60C 1/00; B60C 11/14; B60C 11/16
(52) U.S. Cl. ............ 152/209.5; 152/210; 152/211
(58) Field of Search .................. 152/210, 211, 152/212, 209.5; 36/59 A

(56) References Cited

U.S. PATENT DOCUMENTS

| | | | | |
|---|---|---|---|---|
| 3,566,948 | * | 3/1971 | Menell | 152/210 |
| 3,831,655 | * | 8/1974 | Cantz | 152/210 |
| 5,324,369 | * | 6/1994 | Yamada | 152/211 |
| 5,681,649 | * | 10/1997 | Mashita et al. | 36/84 |
| 5,800,644 | * | 9/1998 | Eromaki | 152/210 |

FOREIGN PATENT DOCUMENTS

| | | | | |
|---|---|---|---|---|
| 23715 | * | of 1906 | (GB) | 152/210 |
| 368411 | * | 3/1932 | (GB) | 152/211 |
| 57-172803 | * | 10/1982 | (JP) | 152/210 |
| 1-249003 | | 10/1989 | (JP) . | |
| 2-84459 | * | 3/1990 | (JP) . | |
| 3-54006 | * | 3/1991 | (JP) | 152/210 |
| 4-358908 | | 12/1992 | (JP) . | |
| 7-256825 | * | 10/1995 | (JP) . | |
| 7-315012 | | 12/1995 | (JP) . | |
| 8-118920 | | 5/1996 | (JP) . | |

* cited by examiner

Primary Examiner—Steven D. Maki
(74) Attorney, Agent, or Firm—Merchant & Gould P.C.

(57) ABSTRACT

An antiskid device (A) mounted to a tread (20) of a tire (2) has a pin (10) and a heat insulating member (11) attached to an end of the pin (10). The pin (10) is made of a material having a higher hardness in a first temperature range not higher than a predetermined temperature and a lower hardness in a second temperature range above the predetermined temperature. The insulating member (11) prohibits heat transfer from the tire (2) to the pin (10).

9 Claims, 6 Drawing Sheets

ANTI-SKID MEMBER AND TIRE EQUIPPED WITH THE ANTI-SKID MEMBER

TECHNICAL FIELD

The present invention relates to an antiskid device suitable for driving an automobile or walking on foot on a frozen or snowy surface. The present invention also relates to an antiskid tire.

BACKGROUND ART

As a common antiskid means for an automobile tire used on a frozen road, metal spikes used to be popularly mounted to the tire. According to this means however, when the automobile is running, the spikes grind the road surface so excessively that the road is severely damaged. In addition, a large amount of dust results. To overcome these problems there is proposed a means such as one disclosed in Japanese Patent Publication No. 1-249003.

According to the means disclosed in the above patent publication, pins made of a predetermined rubber component are mounted to the tire instead of the metal spikes. The pins harden at and below the freezing temperature whereas they soften at higher temperatures. Such a means makes possible to use the hardened pins as spikes at temperatures below the freezing point when the road is frozen. On the other hand, at normal temperatures when the road is not frozen, the pins are softened so that it becomes possible to prevent the pins from unduly grinding the road surface.

However, the above prior art has the following disadvantages.

First, when the car is running, the tires of the car generate eat due to intermolecular friction of the tire rubber and friction from the road, and the heat transfers to each of the pins. Specifically, when the car is running at 40 km/h, the rubber of the tire has an internal temperature of 60° C. to 70° C., increasing the temperature of the pins. Thus, according to the above prior art, even if the car is running on a frozen road, there is an occasion when the heat from the tire prohibits the pins from hardening to a sufficient level necessary for functioning as the spikes.

This problem may be solved by making the pins harden at a higher temperature. However, such can only be achieved by mixing the material rubber with a large amount of additives, which decreases elasticity and strength of the pin, leading to another problem that the pins would be easily damaged when contacted by the road.

Second, when the car is running, the tip potion of the pin contacts the frozen road of a low temperature whereas the base portion of the pin receives heat from the tire. As a result, there is a large temperature difference between the tip portion and the base portion of the pin, causing a substantial difference in the hardness between the tip portion and the base portion of the pin. The base portion which is softer becomes more susceptible to deformation. This leads to a problem that stresses from the operating tire concentrate on the base portion of the pin, causing the pin to fail from fatigue.

DISCLOSURE OF THE INVENTION

It is therefore an object of the present invention to provide an antiskid device capable of eliminating or alleviating the above problems.

Another object of the present invention is to provide an antiskid tire using such antiskid devices.

According to a first aspect of the present invention, an antiskid device is provided. The antiskid device comprises a pin having a higher hardness in a first temperature range not higher than a predetermined temperature and a lower hardness in a second temperature range above the predetermined temperature, and a heat insulating member provided at one end of the pin.

According to a preferred embodiment of the present invention, the pin is formed integrally with the heat insulating member by simultaneous molding.

According to another preferred embodiment of the present invention, the pin is formed of a polymer which is prepared by plasticizing polynorbornene with an aromatic oil. The heat insulating member is formed of a polymer which is prepared by plasticizing polynorbornene with an aromatic oil, and this polymer is mixed with a heat insulating material.

According to a second aspect of the present invention, an antiskid tire is provided. The antiskid tire has a tread provided with antiskid devices. Each of the antiskid devices comprises a pin having a higher hardness in a first temperature range not higher than a predetermined temperature and a lower hardness in a second temperature range above the predetermined temperature, and a heat insulating member at a base end of the pin.

According to a preferred embodiment of the present invention, the tread of the tire includes a recess for receiving each of the antiskid devices. The pin has a tip which is generally flush with or slightly retracted from a surface of the tread.

According to another preferred embodiment of the present invention, the pin has a higher hardness than the tread in the first temperature range and a lower hardness than the tread in the second temperature range.

According to a third aspect of the present invention, an antiskid tire is provided. The antiskid tire has a tread provided with first antiskid devices and second antiskid devices. Each of the first antiskid devices comprises a pin having a higher hardness than the tread in a first temperature range not higher than a predetermined temperature and a lower hardness than the tread in a second temperature range above the predetermined temperature, and a heat insulating member at a base end of the pin. Each of the second antiskid devices comprises a pin made of a rubber having a higher hardness than the tread in a wide temperature range from low to high temperatures.

According to a preferred embodiment of the present invention, each of the second antiskid devices includes a heat insulating member for insulating heat transfer from the tire to the pin of the second antiskid device.

Other features and advantages of the present invention will become clear from the embodiments described below with reference to the accompanying drawings.

BEST MODE FOR CARRYING OUT THE INVENTION

Preferred embodiments of the present invention will be described below with reference to the accompanying drawings.

Figure 3:
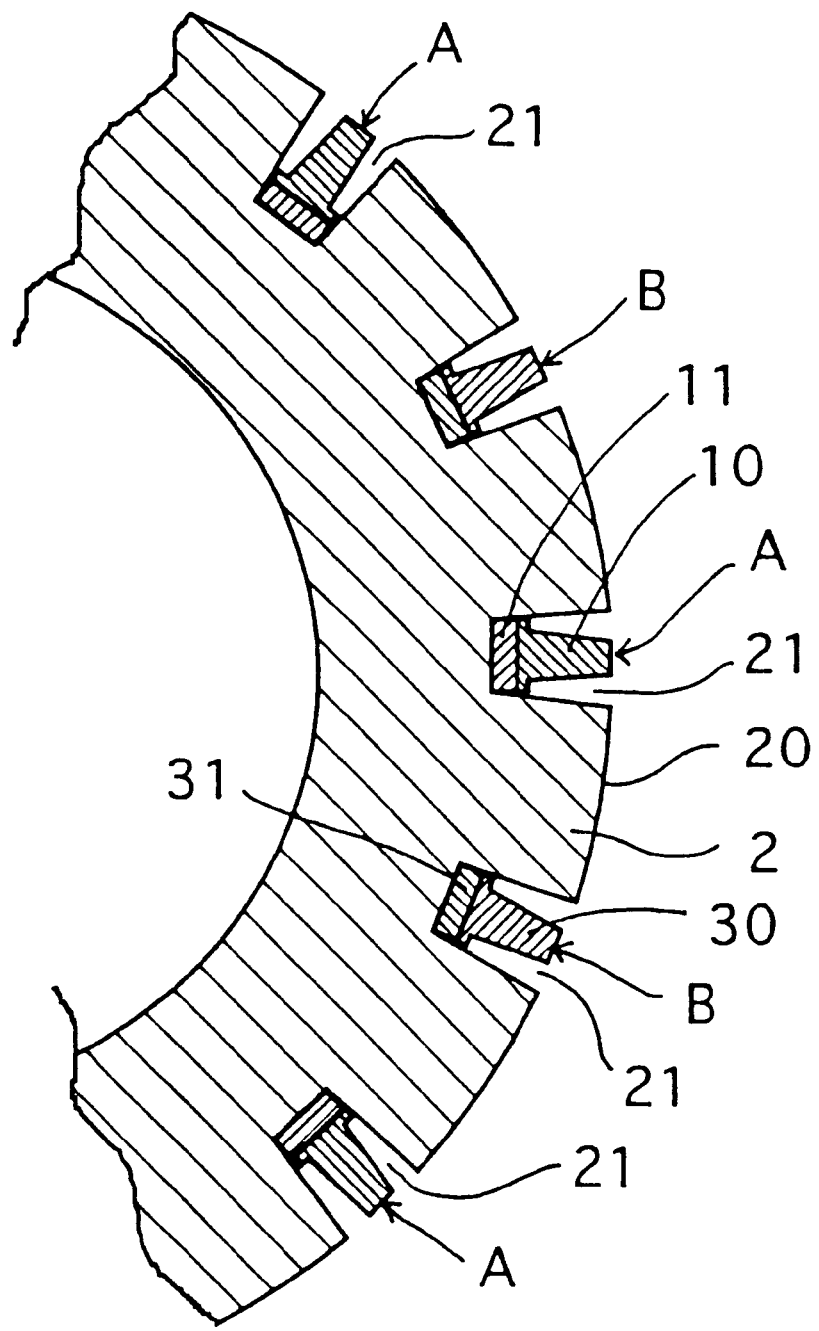
FIG. 3 is an enlarged sectional view of a primary portion of an antiskid tire according to the present invention.
Figure 4:
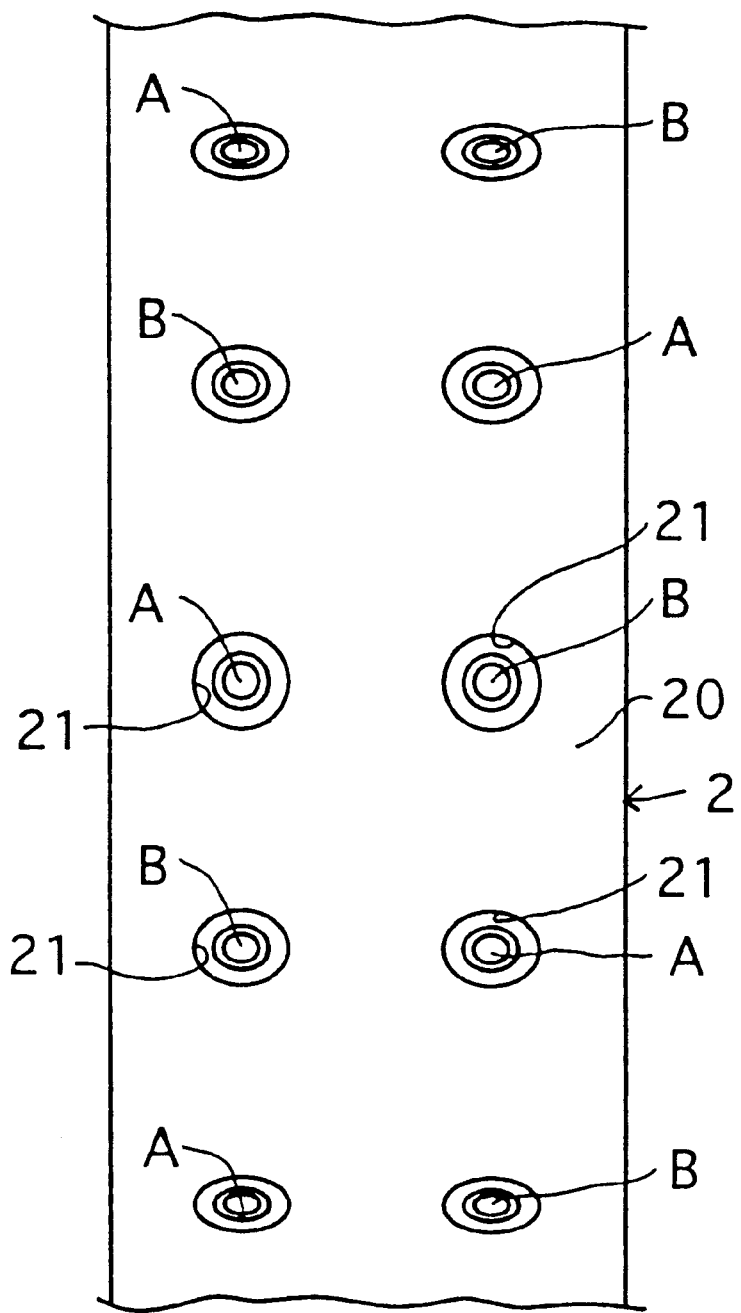
FIG. 4 is a front view of a primary portion of FIG. 3.

As shown in FIGS. 3 and 4, an antiskid tire according to the present embodiment has first antiskid devices A and second antiskid devices B. Each of the first antiskid devices A and second antiskid devices B is mounted in a tread 20 of a tire 2.

Figure 1:
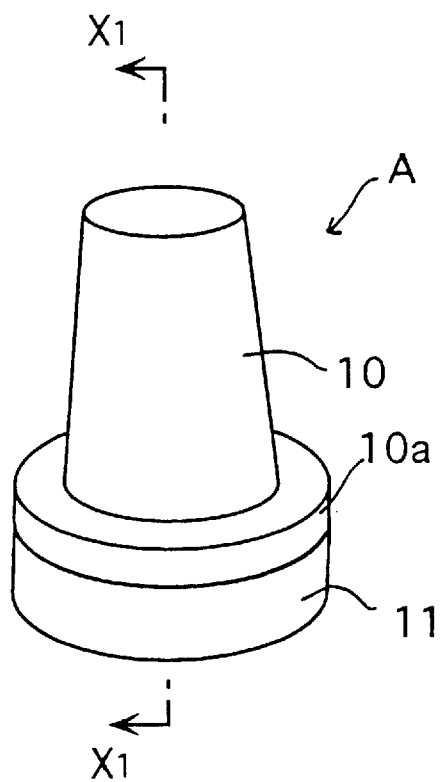
FIG. 1 is a perspective view showing an antiskid device according to the present invention.
Figure 2:
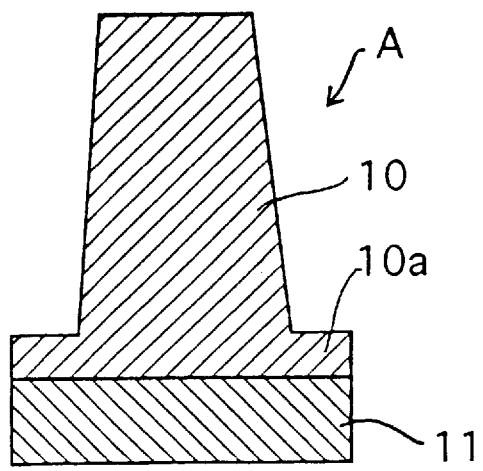
FIG. 2 is a sectional view taken along lines XI—XI in FIG.

As shown in FIGS. 1 and 2, the first antiskid device A comprises a pin 10 and a heat insulating member 11. The pin 10 has a flange base 10a. The flange base 10a is provided with the heat insulating member 11. The pin 10 has a higher hardness in a first temperature range not higher than a predetermined temperature and a lower hardness in a second temperature range above the predetermined temperature.

Specifically, the pin 10 may be made of a polymer having a second order transition point of 0° C.±5° C. The polymer may be prepared by plasticizing polynorbornene with an aromatic oil. Polynorbornene may be prepared through ring-opening-polymerization of norbornene. Norbornene is prepared through the Diels-Alder reaction of cyclopentadiene mixed with ethylene. The polymer is mixed with additives for increased thermal conductivity. Specifically, fine particles of a metal oxide, resin and fine particles of glass are used. The polymer is also mixed with an appropriate amount of carbon particles and other materials for increased strength of the pin 10.

The pin 10 has a hardness of 65° in a temperature range of +5° C. through +10° C. At a temperature above 0° C., the pin is softer than a tread rubber of a common tire (which typically has a hardness of about 70° in the temperature range of +5° C. through +10° C.) However, in a temperature range not higher than 0° C., the hardness of the pin increases sharply to about 95°, exceeding the hardness of the tire tread rubber. Such a characteristic of the pin 10 can be obtained by adjusting a mixing ratio of the polymer and the additives. Specifically, 100 parts of the polymer may be mixed with 30 parts of the metal oxide, 20 parts of resin, and 20 parts of glass particles by volume.

The heat insulating member 11 has a lower thermal conductivity than the pin 10. Specifically, the insulating member 11 may be made mainly of the same polymer prepared by plasticizing polynorbornene with an aromatic oil, but is mixed with heat insulating materials such as granulated or powdered cork and asbestos. For example, 100 parts of the polymer may be mixed with 40 part of cork, and 100 part of asbestos by volume. Cork is advantageous for increasing heat insulation. Asbestos is advantageous for increasing mechanical strength of the insulating member 11 without reducing the high insulating ability.

The insulating member 11 and the pin 10 are formed integrally by simultaneous molding. As compared to a case where the insulating member 11 and the pin 10 are formed separately and then bonded together, the overall mechanical strength can be increased. Since the insulating member 11 and the pin 10 are made generally of the same material, the integral forming can be made more completely, increasing the strength of the antiskid device A further advantageously. It should be noted however, that the present invention is not limited by this. For example, the main material component of the insulating member 11 may be different from the main material component of the pin 10. Likewise, the insulating member 11 and the pin 10 may be formed separately and then bonded together.

Figure 5:
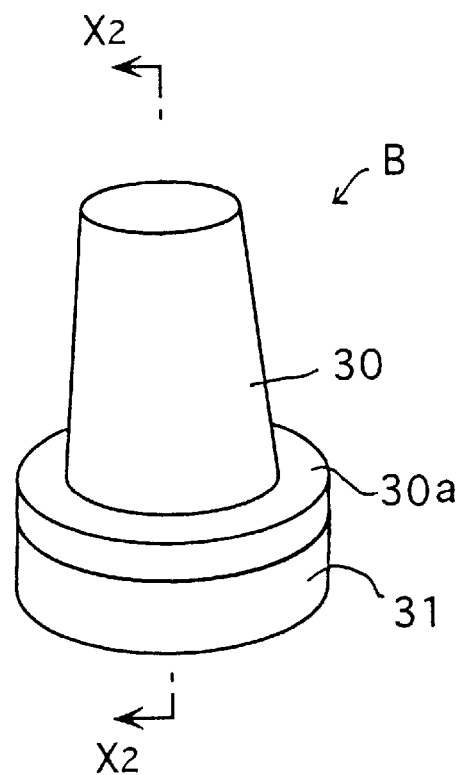
FIG. 5 is a perspective view of a second antiskid device used in the antiskid tire shown in FIG. 3.
Figure 6:
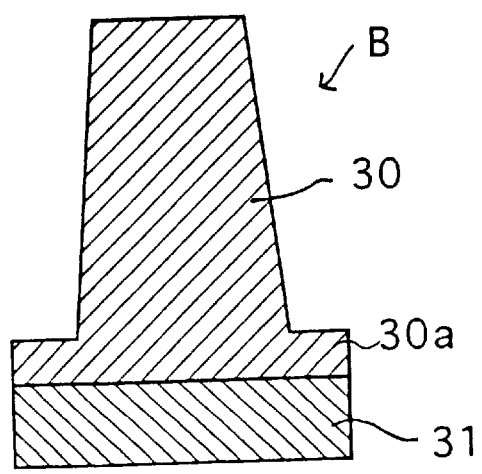
FIG. 6 is a sectional view taken along lines X2—X2 in FIG. 5

As shown in FIGS. 5 and 6, the second antiskid device B comprises a pin 30 and a heat insulating member 31. The pin 30 has a flanged base 30a to which the insulating member 31 is provided. The second antiskid device B has generally the same size and shape as the first antiskid device A.

However, the pin 30 is made of a rubber having a higher hardness than the tread 20 of the tire 2 over a wide temperature range from low temperature range to high temperature range. Specifically, the pin 30 may be made of a synthetic rubber such as a nitrile rubber having a hardness of 95° at normal temperatures.

The insulating member 31 is made of a synthetic rubber such as a nitrile rubber mixed with insulating materials, and has a lower thermal conductivity than the pin 30. The insulating material may be cork and asbestos. The insulating member 31 and the pin 30 are formed integrally by simultaneous molding. Since the insulating member 31 and the pin 30 are made generally of the same material, the integral forming can be made more completely, increasing the strength of the antiskid device B further advantageously just as in the case of the first antiskid device A.

As shown in FIGS. 3 and 4, the tread 20 of the tire 2 is formed with a plurality of recesses 21 each having a predetermined depth. The recesses 21 are disposed at a constant circumferential pitch of the tire 2, and may be made in two rows for example. The first antiskid device A and the second antiskid device B are mounted in respective recesses 21 alternately in each of the circumferential rows of the tire 2. The first antiskid device A is mounted to the tire 2 by bonding the insulating member 11 to the bottom surface of the recess 21 using an adhesive. The tip of the pin 10 is generally flush with the surface of tread 20 or slightly retracted from the surface of tread 20 of the tire 2. When used, the tire 2 contacts a road surface at a deformed state due to compression by the weight of the automobile acting on the tire 2. When the pin 10 hardens, the tip of the pin slightly projects out of the tread 20, sticking appropriately into the road surface. The second antiskid device B is mounted in the same manner as in the first antiskid device A, and therefore detailed description will be omitted here.

Next, with the above arrangement, function of the antiskid tire will be described.

First, when the car is running under a normal temperature condition, the pin 10 is softer than the tread 20. Thus, the road is not unduly ground by the first antiskid device A during normal driving.

On the other hand, the pin 30 is harder than the tread 20 even at a normal temperature. However, the pin 30 is made of rubber, and its hardness is only slightly higher than that of the tread 20. Thus, unlike metal spike antiskid devices mounted to the tire, the second antiskid device B does not excessively grind the road. Preferably, the tire 2 is mounted with about 150 antiskid devices as a total of the first antiskid devices A and the second antiskid devices B. The tire 2 is mounted with the first antiskid devices A and the second antiskid devices B at a ratio of 1:1, so the number of second antiskid devices B may total to a relatively small number of 70 to 80. This small number of the second antiskid devices B further alleviates unduly grinding of the road by the second antiskid devices B.

When the car is running, the tire 2 generates heat due to intermolecular friction of the tire 2 and friction from the road. However, transfer of the heat from the tire 2 to the pin 10 is reduced because the pin 10 is mounted to the tire 2 via the heat insulating member 11. This provides the following advantages.

First, while running on a frozen road, the tip portion of the pin 10 is cooled by contacting the frozen road. Thus, the pin 10 is advantageously protected from the heat coming from the tire 2, making possible to quickly reduce the temperature of the pin 10 generally to the same temperature as of the road surface when running on the frozen road. As a result, the pin 10 hardens quickly and sufficiently so that the pin 10 can function as the spike.

Second, reduced heat transfer from the tire 2 to the pin 10 makes heat distribution in the entire pin 10 more even, allowing the pin 10 to harden more evenly as a whole. This makes it possible to avoid such a situation where the tip portion of the pin 10 is hard enough yet the flange base 10a is unacceptably soft. Thus, repeated stress focusing on the flange base 10a is advantageously avoided, thereby reducing stress damage to the pin 10. Note should be made here that the pin 10 and the insulating member 11 are made of generally the same polymer material having a similar hardness characteristics. The hardness change of the two members occur generally under the same condition. Thus, the hardness becomes even not only throughout the pin 10 but also between the pin 10 and the insulating member 11, increasing the overall strength, thereby further reducing damage to the first antiskid device A.

Third, the pin 10 may only be made so as to become harder than the tread 20 at and below 0° C. It is no longer necessary to make the pin to become harder than the tread 20 at a higher temperature in order to compensate for the influence of heat from the tire 2. Thus, in making the pin 10 from the polymer it is no longer necessary to mix a large amount of additives in order to increase the temperature at which the pin 10 hardens. This further makes possible to eliminate a problem of reduced strength of the pin 10 due to the mixing of large amount of additives.

Next, description will be made for the function of the second antiskid device B. The pin 30 is harder than the tread 20 of the tire 2 regardless of the road temperature. Thus, the second antiskid device B provides antiskid effect while running on a frozen road. Further, the second antiskid device B provides an additional advantage in relation with the first antiskid device A. Specifically, the first antiskid device A becomes harder than the tread 20 at 0° C. or below. In reality however, the first antiskid device A can only harden with a certain time lag after the temperature of the road has changed. Further, the road conditions change constantly, and temperature distribution on the road is not even. For example, the road having a representative surface temperature of 0° C. may have frozen areas having substantially lower temperatures. When running on such a surface, the first antiskid device A may not be sufficiently cooled by the road surface, being unable to become harder than the tread 20. According to the present antiskid tire, even in such a situation, the second antiskid device B mounted to the tire 2 provides the antiskid function to the tire 2. Thus, the antiskid function unobtainable by the first antiskid device alone can be obtained.

The second antiskid device B becomes slightly softer when the temperature rises. The heat generated in the tire 2 is prohibited from transferring to the pin 30 by the insulating member 31. Thus, unacceptable softening of the pin 30 while the car is running is eliminated without sacrificing the spiking function of the second antiskid device B.

According to the above embodiment, a combined effects from the first and second antiskid devices provides an excellent antiskid function. The present invention is not limited to this however. For example, a tire may be mounted only with the first antiskid devices according to the present invention.

Figure 7:
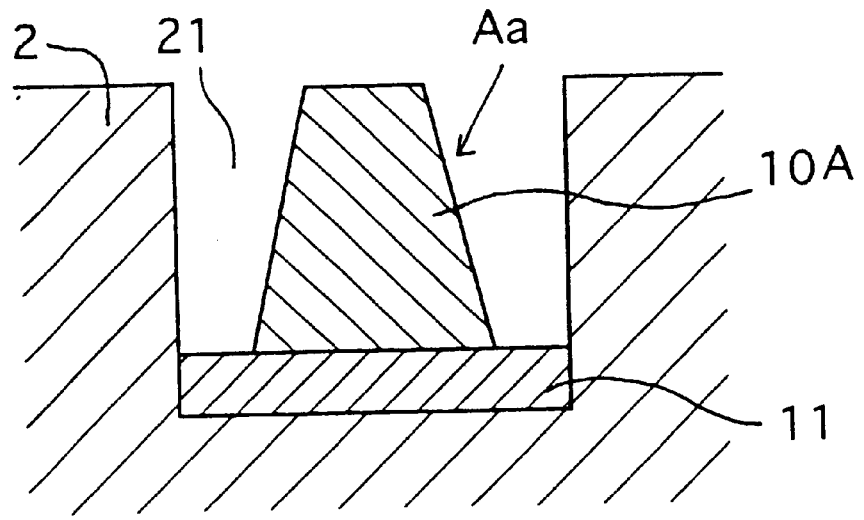
FIG. 7 is a sectional view showing another antiskid device according to the present invention.
Figure 8:
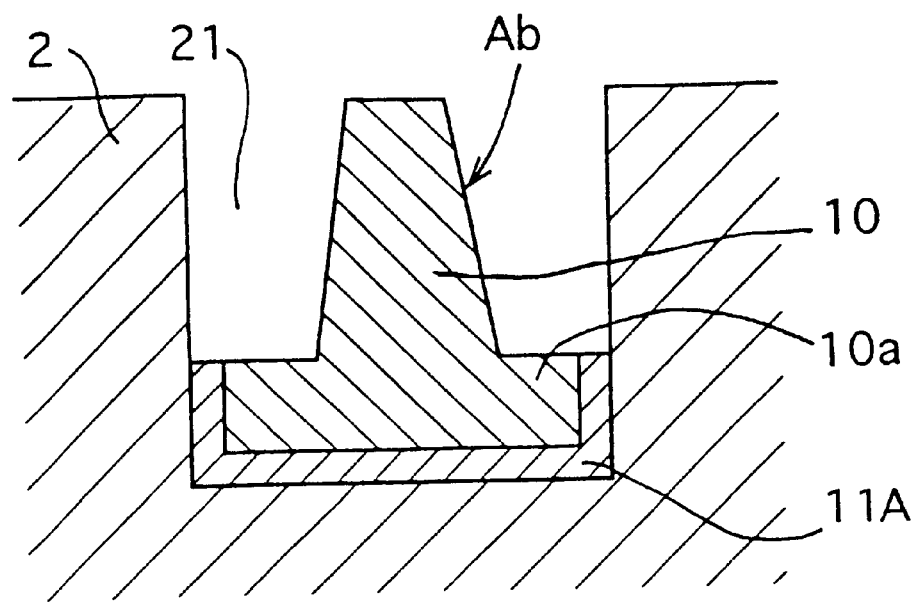
FIG. 8 is a sectional view showing still another antiskid device according to the present invention.
Figure 9:
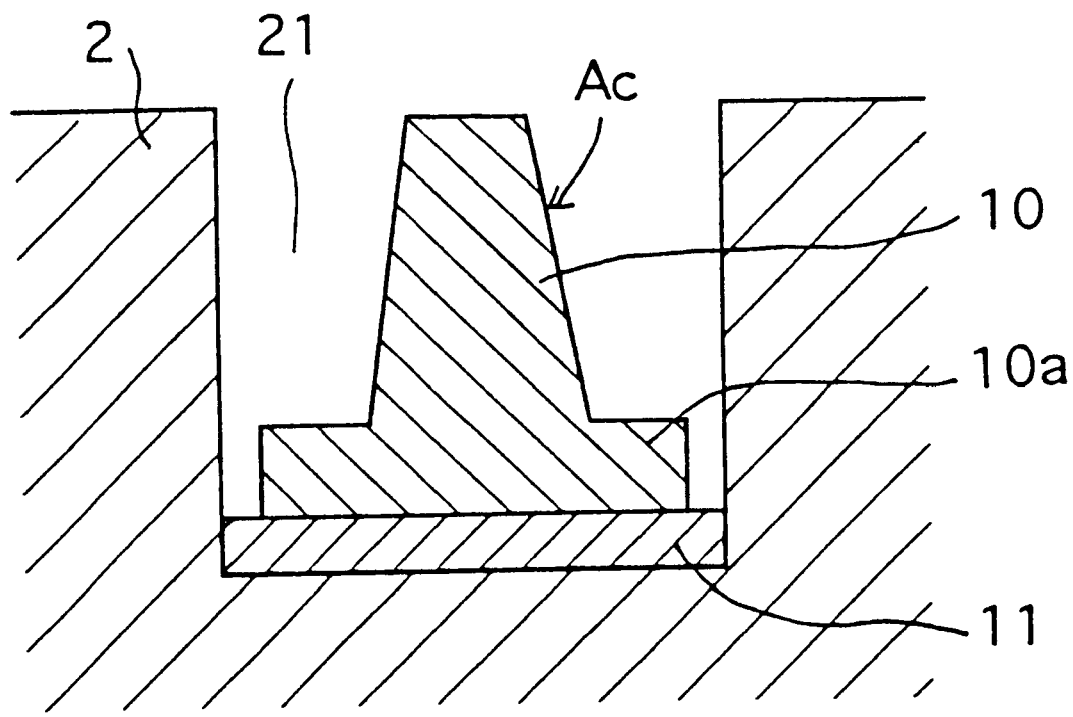
FIG. 9 is a sectional view showing still another antiskid device according to the present invention.

Further, the present invention is not limited to the above embodiment in terms of the specific form of the antiskid device. For example, antiskid devices Aa through Ac respectively shown in FIGS. 7 through 9 are also included in the scope of the present invention. Specifically, the antiskid device Aa shown in FIG. 7 comprises a pin 10A and an insulating member 11 provided at the end of the pin. The pin 10A does not have a flange at its base. The insulating member 11 is a flange having a greater diameter than the pin 10A. According to this antiskid device Aa it becomes possible to prohibit the base of the pin 10A from contacting the tire 2, reducing the heat transfer from the tire 2 to the pin 10 more effectively.

According to the antiskid device Ab shown in FIG. 8, a flange base 10a of the pin 10 has bottom and side surfaces covered by a heat insulating member 11. According to the antiskid device Ac shown in FIG. 9, a pin 10 has a flange base 10a provided with a heat insulating member 11 having a greater diameter than the flange base 10a. Like the antiskid device Aa, each of the antiskid devices Ab, Ac makes possible to prohibit the pin 10 from directly contacting the tire 2, reducing the heat transfer from the tire 2 to the pin 10 more effectively.

The antiskid device and the antiskid tire according to the present invention may be varied in shape, material and many other ways. For example, the antiskid device may be mounted to the recess of the tire by driving the heat insulating member of the antiskid device into the bottom of the recess. Further, application of the antiskid device according to the present invention is not necessarily limited to antiskid tires. For example, the antiskid device according to the present invention may be mounted to the sole of a shoe for walking on a frozen or snowy road. Further, the antiskid device may be mounted to the lower end of a crutch. According to the present invention, heat transfer from above the shoe sole or the crutch is prohibited, thereby making possible to harden the pin under a predetermined temperature condition for functioning as an antiskid spike.

FIELD OF APPLICATION

The antiskid device and the antiskid tire according to the present invention may be used in automobile tires for running on a frozen or snowy road. The antiskid device according to the present invention maybe mounted to a shoe sole as an antislip device, too.

What is claimed is:

1. An antiskid device comprising:
   a pin portion formed of a resin having a higher hardness in a first temperature range not higher than a predetermined temperature and a lower hardness in a second temperature range above the predetermined temperature; and
   a heat insulating portion provided at one end of the pin portion and formed of said resin mixed with a heat insulating material;
   wherein the pin portion and the heat insulating portion are formed integrally by simultaneous molding.

2. The antiskid device according to claim 1, wherein the resin is prepared by plasticizing polynorbornene with an aromatic oil.

3. The antiskid device according to claim 1, wherein the heat insulating material is cork.

4. The antiskid device according to claim 1, wherein the heat insulating material is asbestos.

5. The antiskid device according to claim 1, wherein the heat insulating material is a mixture of cork and asbestos.

6. An antiskid tire having a tread provided with antiskid devices,
   wherein each of the antiskid devices comprises a pin portion formed of a resin having a higher hardness in first temperature range not higher than a predetermined temperature and a lower hardness in a second temperature range above the predetermined temperature, and a heat insulating portion provided at a base end of the pin portion and formed of said resin mixed with a heat insulating material, the pin portion and the heat insulating portion being formed integrally by simultaneous molding.

7. The antiskid tire according to claim 6, wherein the tread of the tire includes a recess for receiving each of the antiskid devices, the pin portion having a tip which is generally flush with or slightly retracted from a surface of the tread.

8. The antiskid tire according to claim 6, wherein the pin portion has a higher hardness than the tread in the first temperature range and a lower hardness than the tread in the second temperature range.

9. An antiskid tire having a tread provided with first antiskid devices and second antiskid devices:
   wherein each of the first antiskid devices comprises a pin portion formed of a resin having a higher hardness than the tread in a first temperature range not higher than a predetermined temperature and a lower hardness than the tread in a second temperature range above the predetermined temperature, and a beat insulating portion at a base end of the pin portion and formed of said resin mixed with a heat insulating material, the pin portion and the heat insulating portion being formed integrally by simultaneous molding; and
   wherein each of the second antiskid devices comprises a pin made of a rubber having a higher hardness than the tread in the first and the second temperature ranges.

* * * * *